Patented Feb. 10, 1931

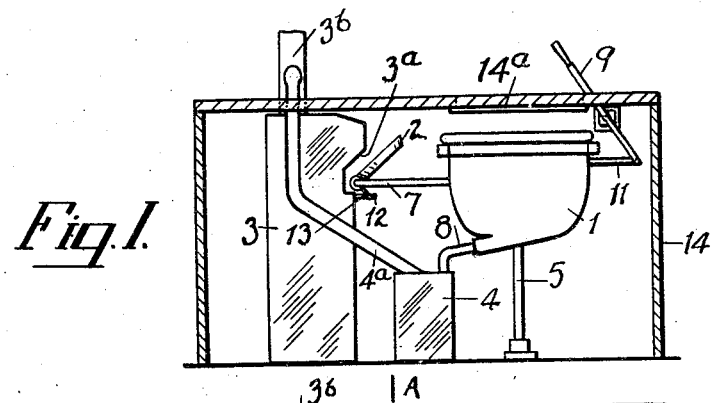
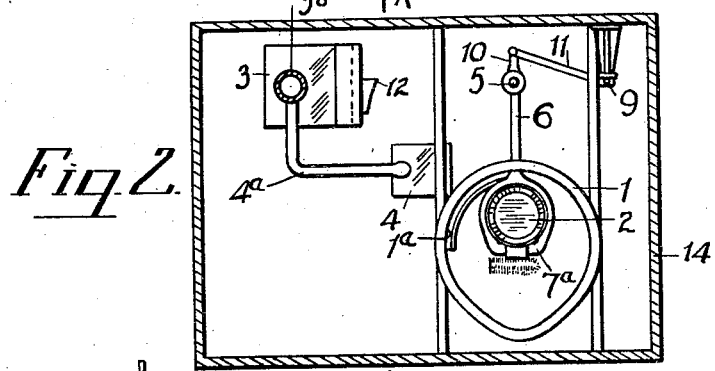
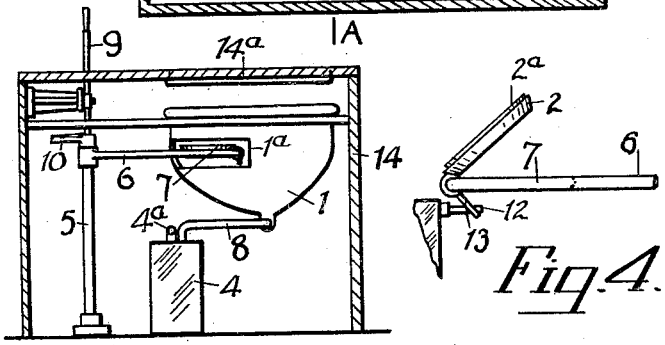
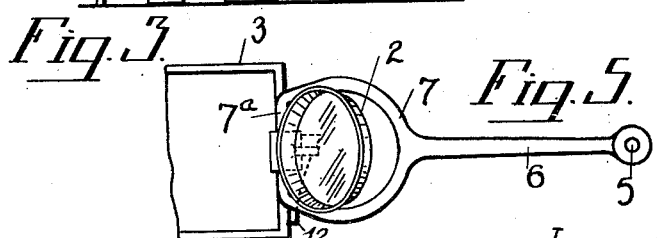

1,792,008

UNITED STATES PATENT OFFICE

SIMON FRASER, OF DUNSTABLE, ENGLAND

WATER-CLOSET

Application filed March 4, 1930, Serial No. 433,144, and in Great Britain October 5, 1929.

The invention relates to improvements in sanitary closets for use in places where no proper sewage disposal is available and has for its object to provide a compact and sanitary apparatus for the effective treatment and disposal of solid and liquid excrement.

According to the invention a pan having a seat is employed, and mounted adjacent said pan is an upright post pivotally carrying at a suitable elevation, a horizontal arm, and at its free end, provided with a ring or fork to which is hinged or pivotally mounted a bucket adapted to receive a container or receptacle preferably having a similar shape to loosely fit the same and said container or receptacle is formed of any suitable readily inflammable material.

A destructor is provided which is located in such position that the pivotal arm carrying the bucket can be moved through a hole in the pan into such position that the tiltable bucket with its container carrying the solid excrement can be tilted so that said container and excrement fall into said destructor, which is heated by any suitable means, electrical or otherwise, and are destroyed, a lever mounted in a convenient position and connected with the pivotal arm by a link or links or lever or levers, being provided for moving said bucket into a position adjacent the destructor, means being provided for automatically tilting the bucket so that its contents fall into the destructor upon arrival of the bucket at that position.

The liquid excrement is carried away from the pan to an evaporator through a pipe connected therewith and with the bottom of the pan.

The apparatus is preferably enclosed in a casing having an opening coincident with the pan.

In order that the invention may be clearly understood and readily carried into effect I will now describe the same fully with reference to the accompanying drawings, in which:

Figure 1 is a side elevation of an apparatus constructed according to the present invention, the casing being shown in section; Fig. 2 is a plan thereof; Fig. 3 is a transverse section taken on the line A—A of Fig. 2; Fig. 4 is a detail view of the means for automatically tilting the bucket upon arrival at the destructor and Fig. 5 is a plan thereof.

Referring to the drawings, 1 represents the pan, 2 the tiltable bucket, 3 the destructor for the solid excrement and 4 the evaporator for the liquid excrement.

Adjacent the pan 1 is located a vertical post 5 upon which is pivotally mounted an horizontal arm 6, carrying at its free end a ring 7 having a straight portion 7a at the front thereof, to which the bucket 2 is hinged and within said bucket loosely fits a container, lining or receptacle 2a having a similar shape to the bucket which is preferably of shallow or tray formation.

The destructor 3 which is preferably of the shape shown at Fig. 1 although it may be of any other suitable shape, is provided with an opening 3a through which the solid excrement is tipped by the bucket 2 when tilted as hereinafter described and said destructor 3 is heated by any suitable means (not shown) which may be electrical or otherwise and provided with a flue 3b which may be arranged to join the flue of a house or other structure or may be extended directly to the outside of the structure as a separate flue.

The evaporator 4 is connected with the bottom of the pan 1 by means of a pipe 8 which is preferably provided with a nonreturn valve to prevent fumes escaping through the pan 1, and the liquid excrement passes from the pan 1 through said pipe 8 into the evaporator 4 which is also heated by electrical or other suitable means, and is provided with a flue 4a which is shown connected to the destructor flue 3b and through which noxious fumes pass away. Or the evaporator flue 4a may extend directly to the outside of the structure.

In its normal position which is shown at Fig. 2, the arm 6 carrying the ring 7 and bucket 2 projects into the pan 1 through a segmental slot 1a and said arm is moved by means of a hand lever 9 pivotally mounted upon the casing 14 hereinafter referred to, or other fixed part, in a convenient position, and connected by means of a link 11 with a lever 10, also mounted on the vertical post 5 and fixed with the arm 6 so that by operating said hand lever 9 the bucket 2 may be moved into the position shown at Fig. 1.

The apparatus is, as shown, enclosed in a casing 14 having an opening 14a coincident with the top of the pan 1 and the casing surrounding said opening 14a may be covered with, or have a seat formed of, non-inflammable celluloid.

In order to tilt the bucket 2 upon its arrival at the position shown in Fig. 1, a cam or projection 12 is provided upon the destructor 3 and the hinge of the bucket 2 is provided with a coacting cam, tooth or detent 13 which comes against the cam or projection 12 of the destructor 3 near the end of the movement of the arm 6 tilting the bucket 2 throwing the container 2a with the solid excrement into the destructor 3 in which it is destroyed and the bucket 2 returns to its normal position when the arm 6 is moved back into the position shown at Fig. 2.

It will be understood that the details of construction of the apparatus may be modified without departing from the principle of the invention.

I claim:

1. A sanitary closet comprising a pan adapted for receiving liquid excrement, a slot in said pan, a tiltable bucket located within said pan, a loose lining to said bucket for receiving solid excrement, means for supporting said bucket, said supporting means being capable of horizontal movement, a destructor adjacent said pan capable of destroying solid excrement, an opening in said destructor, means for moving said bucket to the destructor opening, means for tilting said bucket, an evaporator for evaporating liquid excrement, means for conveying the liquid excrement from the pan to said evaporator, and means for conveying away the fumes.

2. A sanitary closet comprising a pan for receiving liquid excrement, a slot in said pan, a vertical post located adjacent said pan, an arm pivotally mounted on said post and projecting through said slot into said pan, a tiltable bucket carried by said arm within the pan, an inflammable lining loosely fitting said bucket, a destructor located adjacent said pan capable of destroying solid excrement, an opening in said destructor, means for moving the bucket to said opening, means for collecting and evaporating the liquid excrement, and means for carrying away the fumes.

3. In a sanitary closet as claimed in claim 1, means for moving the bucket carrying arm comprising a hand lever pivotally mounted adjacent the pan, a lever pivotally mounted on the vertical post and fixed with the bucket carrying arm and a link connecting said lever with said hand lever.

4. In a sanitary closet as claimed in claim 1, a tiltable bucket, means for supporting said bucket, and a lining for receiving solid excrement adapted to loosely fit said bucket, said lining being constructed of highly inflammable material.

5. In a sanitary closet as claimed in claim 1, a vertical post, an arm pivotally mounted on said post, a ring at the end of said arm, a straight portion to said ring, and a tiltable bucket pivotally mounted upon said straight portion of said ring.

6. In a sanitary closet as claimed in claim 1, means for automatically tilting the bucket comprising a cam upon the destructor, and a co-acting projection upon the hinge of the tiltable bucket, said cam and projection being adapted to engage one another near the end of the movement of the pivotal arm and tilt the bucket.

7. In a sanitary closet as claimed in claim 1, a pan, a heatable evaporator for collecting liquid excrement, a pipe connecting said pan with the evaporator, and means for carrying away the fumes.

SIMON FRASER.